United States Patent

Lieb et al.

[11] Patent Number: 5,907,927
[45] Date of Patent: Jun. 1, 1999

[54] DEVICE FOR LINKING A WINDOW PANE TO A WINDOW LIFTER

[75] Inventors: Hans-Dieter Lieb, Coburg; Barry Edwards, Bamberg, both of Germany

[73] Assignee: Brose Fahrzeugteile GmbH & Co. KG, Coburg, Germany

[21] Appl. No.: 08/793,961

[22] PCT Filed: Sep. 8, 1995

[86] PCT No.: PCT/DE95/01273

§ 371 Date: Jun. 25, 1997

§ 102(e) Date: Jun. 25, 1997

[87] PCT Pub. No.: WO96/08386

PCT Pub. Date: Mar. 21, 1996

[30] Foreign Application Priority Data

Sep. 16, 1994 [DE] Germany .............................. P4433052

[51] Int. Cl.$^6$ ....................................................... B60J 1/00
[52] U.S. Cl. ................................................................. 49/375
[58] Field of Search .............................. 49/375, 374, 372; 52/204.597, 204.67, 204.68

[56] References Cited

U.S. PATENT DOCUMENTS

| 4,866,895 | 9/1989 | Hlavaty ...................................... 52/208 |
| 4,987,699 | 1/1991 | Gold .......................................... 49/375 |
| 5,050,348 | 9/1991 | Kane et al. ............................. 49/375 X |
| 5,199,217 | 4/1993 | Roze ......................................... 49/375 |

FOREIGN PATENT DOCUMENTS

| 173091 | 3/1986 | European Pat. Off. . |
| 208237 | 1/1987 | European Pat. Off. . |
| 294254 | 12/1988 | European Pat. Off. . |
| 362027 | 4/1990 | European Pat. Off. . |
| 2648504 | 12/1990 | France . |
| 2458314 | 6/1976 | Germany . |
| 3108244 | 6/1982 | Germany . |
| 3817260 | 11/1989 | Germany . |
| 4102941 | 8/1992 | Germany . |
| 4218425 | 12/1993 | Germany . |
| 6135228 | 5/1994 | Japan . |

*Primary Examiner*—Jerry Redman
*Attorney, Agent, or Firm*—Christie, Parker & Hale, LLP

[57] ABSTRACT

Apparatus for linking a window pane to a window lifter which includes one or more inner jaws for holding the window pane and a pair of outer jaws for holding the inner jaws. The inner jaw or jaws each have one free end and one end pivotably attached at a junction to a base. The outer jaws have hooked ends to engage the junction in a mounting position in which the inner jaws are splayed to accept the window pane. The assembly consisting of the one or more inner jaws, base and window pane is pushed into the outer jaws until the hooked ends of the outer jaws engage the free ends of the one or more inner jaws, thereby locking the assembly in position.

18 Claims, 5 Drawing Sheets

DEVICE FOR LINKING A WINDOW PANE TO A WINDOW LIFTER

BACKGROUND OF THE INVENTION

The invention relates to a device for linking a window pane to a window lifter, in particular such a device for use in motor vehicles.

Various types of devices to link a window pane to a window lifter are known. They are basically differentiated as form-fitting links, e.g., snappable links, frictional clamping links, and adhesive-bonded links.

EP 0 208 237 B1 discloses a "snappable" support element to link the window pane with a corresponding guidance arrangement, which has several elastic support tabs disposed on both sides of the bottom edge of the window pane. One of the support tabs has a pin which is positioned to engage a hole in the window pane. Upon insertion of the window pane between the elastic tabs, they bend outward until the pin is engaged in the hole in the window pane. However, it is difficult when mounting the window pane to obtain alignment between the hole and the pin. Because of inevitable manufacturing tolerances, it is necessary to provide a certain excess distance of the pin from the bottom surface on which the bottom edge of the window is stopped to ensure reliable engagement, resulting in a gap between the bottom of the window pane and the bottom surface in the support element. This results in "play" of the window pane in the support tabs which may in turn cause noise, especially when reversing the direction the window pane is moving. Moreover, the assembly of the support described requires a relatively expensive tool because of its complex design.

Another snappable coupling arrangement between the pane and the lifter is presented in DE 31 08 244 A1. It consists of two channel-type tabs connected to each other, one of which is open at the top and engages the bottom edge of the window pane. The other tab is open toward the bottom and has on its ends inwardly directed hooks which engage protrusions on the lift arrangement to obtain a form-fitting link. The snapping in of the linking elements as described is supposed to be forced by moving the window pane against its upper, stop position thereby simultaneously and automatically aligning the pane in the frame construction. However, since the profile-type coupling elements is premounted on the bottom edge of the pane, the associated added thickness results in more difficult insertion of the window pane into the door channel. Also, because of the necessary lack of seals in this area, paint damage often occurs during mounting. The minimal tolerances between the door channel and the coupling elements necessary to prevent noises during motion reversal of the window lifter can present an additional problem in this type of arrangement.

Japanese Patent 6-135228 discloses variants very similar to the above-described design. The profiles are merely disposed in opposite directions.

German Patent DE 42 18 425 presents a typical frictional clamped link between a window pane and a window lifter. According to it, the window pane is gripped between two jaws coated with rubber. Tension is generated by a screw connection above a support between the two gripping jaws. This linking variant does have the advantage that the window pane may be inserted into the door channel without any problem, even when the seals for the window pane have already been installed in the door channel. However, the large number of parts which comprise the arrangement is a disadvantage.

German Patent DE 38 17 260 C2 discloses a lifting rail which is secured to the area of the bottom edge of the window pane with an adhesive and is mounted outside the door.

A window pane for motor vehicles with a rail secured thereto to link to a window lifter is further known from EP 0 173 091 A2. According to it, a window pane is placed with its edge in the U-shaped cross-sectional area of a metal rail. In the U-shaped cross-sectional area, retaining strips, which position the window pane relative to the rail and hold it at a distance, are also used. In order to link the U-shaped rail with these retaining strips, the retaining strips have on their respective two legs an outwardly directed protrusion which engages an associated recess in a respective adjacent leg of the rail. The remaining intermediate space between the window pane and the U-shaped cross-sectional area of the rail is filled with a hardening adhesive.

This type of window pane attachment is very expensive. The retaining strips must first be inserted into the U-shaped rail. Following that, the window pane is placed in the U-shaped rail and the intermediate space between the window pane and the U-shaped rail is filled with adhesive.

SUMMARY OF THE INVENTION

One embodiment of the invention is a device to link a window pane to a window lifter which has a mounting position for installation and a working position after installation is completed. The device includes a base with at least one inner contact jaw for contacting the window pane. The inner contact jaw is swivellingly attached to the base at one end and free at the other end. The device also includes a pair of outer supporting jaws between which the window and inner contact jaw are locked in the working position. In the mounting position, the window pane is pressed onto the base with the inner contact jaw splayed at an angle to a plane of the window pane, and an adjacent one of the outer supporting jaw engages the base end of the inner contact jaw. As the device is moved into the working position, the inner contact jaw is hinged against the window pane by the adjacent one of the outer supporting jaws, and the inner contact jaw and window pane locked therebetween.

Another embodiment of the invention is an apparatus for linking a window pane to a window lifter which includes at least one inner jaw for holding the window pane and a pair of outer jaws for holding the inner jaws. Such inner jaw has one free end and one end pivotably attached at a junction to a base. The outer jaws have hooked ends to engage the junction in a mounting position in which the inner jaw is splayed to accept the window pane. The assembly consisting of the inner jaw, base and windowpane is pushed into the outer jaws until the hooked ends of the outer jaws engage the free ends of the inner jaws, thereby locking the assembly in position.

According to a preferred embodiment, the device comprises at least one inner contact jaw (preferably a pair of inner contact jaws), swivellingly mounted on a base and connected with outer supporting jaws. In the mounting position, the base is gripped by the free ends of the outer supporting jaws so as to move in the mounting direction of the window pane with a form-fitting engagement. After movement of the base, along with the inner contact jaws in the direction of the base of the outer supporting jaws, the position of the inner contact jaws to the outer supporting jaws is locked when the working position is reached.

Depending on the type of link selected, e.g.:

a pure form-fit between the window pane and an inner contact jaw or a pair of inner contact jaws, an adhesive link between the window pane and a clamping jaw or a pair of inner contact jaws, a friction link through the pressing of a friction layer with a high coefficient of friction (rubber, for example) secured on the inner contact jaw against the surface of the window pane, or any combination of the aforementioned link types, the selection of the material and the sizing of the components of the linking device according to various embodiments of the invention are carried out.

Particularly advantageous are adhesive links, whereby the inner side of the contact jaw is provided with an adhesive, preferably with a two-sided adhesive tape. During the mounting process, wherein the bottom edge of the window pane moves the contact jaw including its base between the outer supporting jaws until the lockable working position is reached, the contact jaws initially positioned at an angle to the window pane surface, are hinged by the free ends of the outer supporting jaws against the surfaces of the window pane and pressed by the inward directed hooks provided on the free ends of the outer supporting jaws to lock the working position of the contact jaws. To compensate for any play between the inner contact jaws and the outer supporting jaws after the working position is reached, it is possible to provide an elastic element between the base of the inner and the base of the outer jaws, which reliably prevents undesirable differential movements and any resultant noise.

The parts may be for example, extruded or injection molded plastics; extruded Al/Mg parts or shaped sheet metal parts.

Besides the adhesive tape described, other adhesives may also be used. For example, the inner surfaces of the inner contact jaws may be have an adhesive reservoir (or a plurality of small reservoirs), which release the adhesive when adequate pressure is applied. Another possibility consists of using a thermally activatable adhesive, for example.

However, if the inner surfaces of the contact jaws described have a rubber coating or the like, a friction link with the window pane is developed. In order to obtain the required lowering forces, an adequately strong pressure must be applied by the outer supporting jaws and transferred to the inner contact jaws. The sizing of the supporting jaws, which are already under tension after insertion of the base part of the inner contact jaws between the free ends of the supporting jaws, must be appropriate.

Both link variants described above may also be provided with a form-fitting connection, whereby, for example, at least one contact jaw bears a bump or the like facing the window pane, which engages in an associated hole or groove in the window pane when the window pane presses the base with the at least one contact jaw between the supporting jaws from the mounting position into the working position. Thus, the window pane link is also still guaranteed if the bearing capacity of the adhesive link should weaken or the elasticity of the supporting jaws should relax after a long period of time.

Form-fitting links are may also be produced wherein the positive engagement occurs only upon plastic deformation of the parts. Thus, the surface of the window pane may have, in its attachment area, a raised structure, for example, a grooving running at a right angle to the direction of movement, which presses into the softer material of the inner contact jaws and thus forms a form-fitting link.

To keep the number of components of the link according to the invention as small as possible, both the outer supporting jaws with their common base and the inner contact jaws or the pair of inner contact jaws with their base are implemented in one piece in each case. The necessary mobility of the inner contact jaws on their base is ensured when plastic is used as a material preferably by so-called living hinges and when metal is used by adequately plastically or elastically deformable areas.

DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION OF THE INVENTION

The embodiment depicted in FIGS. 1a–1d has a slider 4 formed in one piece on a supporting jaw 2'. The slider 4 engages a guide rail (not shown) in a movable, form-fitting connection. Preferably, all parts of the linking device according to the invention are plastic.

Figures 1A, 1B:
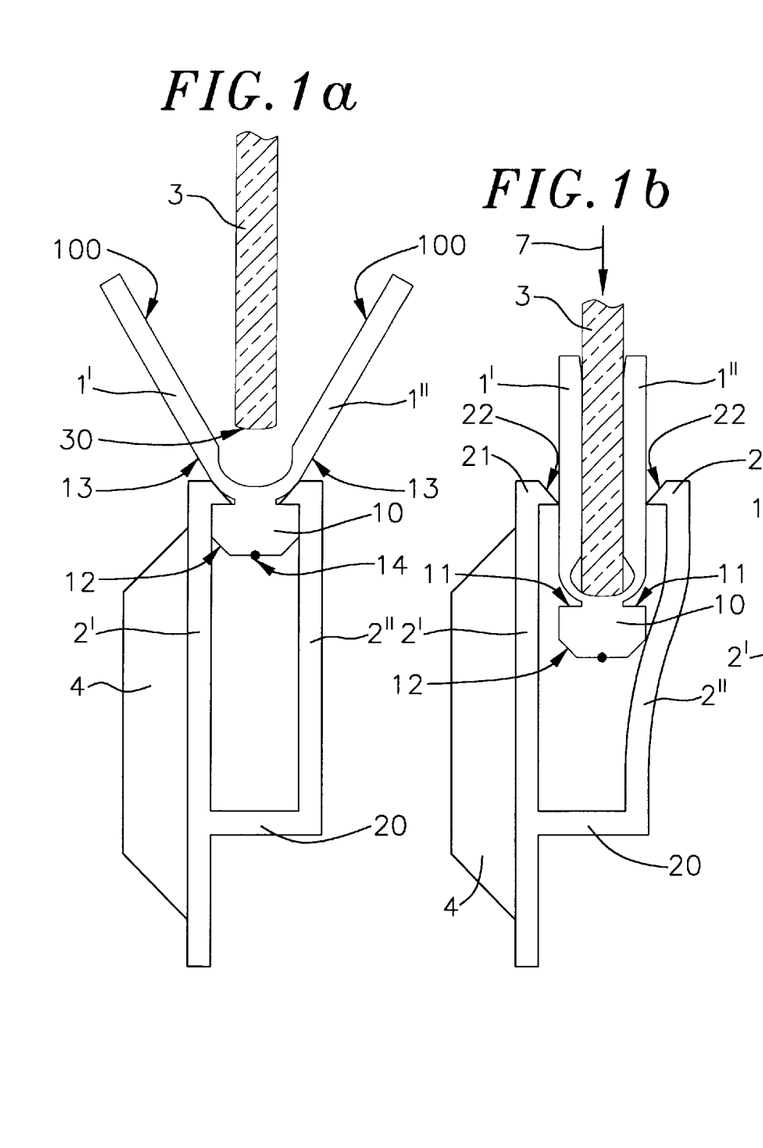
FIG. 1a illustrates an embodiment of the invention used to link a window pane with a window lifter using an adhesive link between a pair of inner contact jaws and the window pane before mounting in the mounting position.
FIG. 1b is similar to FIG. 1a, but shown during mounting.

FIG. 1a depicts the device immediately before mounting and with the window pane 3 positioned between two contact jaws 1', 1", laterally splayed to accept a window pane 3. The two contact jaws 1', 1" swivellingly, or pivotably connected to a base 10 by means of a jointed area 13 (a so-called living hinge) and include adhesive elements 100 on their inner surfaces. At their free ends, outer supporting jaws 2', 2", which are connected to each other by a base 20, surround the base 10 of the inner contact jaws 1', 1". Hooks 21 at the ends of the outer supporting jaws 2', 2" grip stop surfaces 11 adjacent the base 10 and the jointed area 13 maintain the device in this position until mounting.

For premounting of the linking device, the base 10 may be pressed through the gap between the hooks 21, whereby the parts slip via their complementary sloped surfaces 12, 22 until the mounting position is reached, in which the hooks 21 of the supporting jaws 2', 2" come into contact with the stop surfaces 11 of the base 10. However, it is also possible to position the base 10 between the upper ends of the supporting jaws 2', 2" by insertion from an open side of the jaws (not shown).

If the window pane 3 is now pushed in mounting direction (see FIG. 1b), it encounters the base 10 and pushes it, along with the inner contact jaws 1', 1" formed thereon, in the direction of the base 20 of the outer supporting jaws 2', 2". At this time, the hooks 21 slide onto the outer surfaces of the contact jaws 1', 1" thereby clamping them, and associated adhesive elements 100, against the surface of the window pane. The outer supporting jaws 2', 2" are displaced and thereby placed under tension, causing them to press the adhesive elements 100 securely onto the window pane 3.

A two-sided adhesive tape is suitable as adhesive element 100. Not until immediately before mounting of the window lifter is the protective film removed. An alternative to this are adhesives which are applied on the inner sides of the contact jaws 1', 1" either immediately before the mounting process or adhesive reservoirs which cling to the inner sides of the contact jaws 1', 1" and are released from the reservoir when the pressure resulting from insertion is applied.

Instead of pressing the window pane 3 into the linking device, the linking device may be pressed onto the window pane 3 using the window lifter to apply the force required for assembly. Preferably, the window is in its highest position in the frame (not shown), or rather the closed position, in which the top edge (not shown) of the window pane 3 abuts the frame. In this manner, the window pane 3 is automatically adjusted to correctly fit into the frame in the closed position.

Figure 1C:
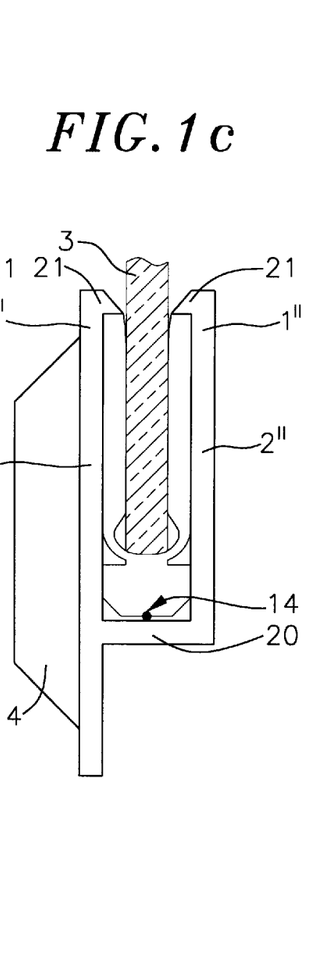
FIG. 1c is similar to FIG. 1a, but shown after completion of mounting, in a locked working position with a bottom edge of the window pane fully engaging the linking device.

The mounting process is finished when, simultaneously, the inner base 10 strikes the outer base 20 with spring element 14 and the hooks 21 of the outer supporting jaws 2', 2" grip over the free ends of the inner contact jaws 1', 1" thereby forming the link between the window lifter and the window pane 3.

Figure 1D:
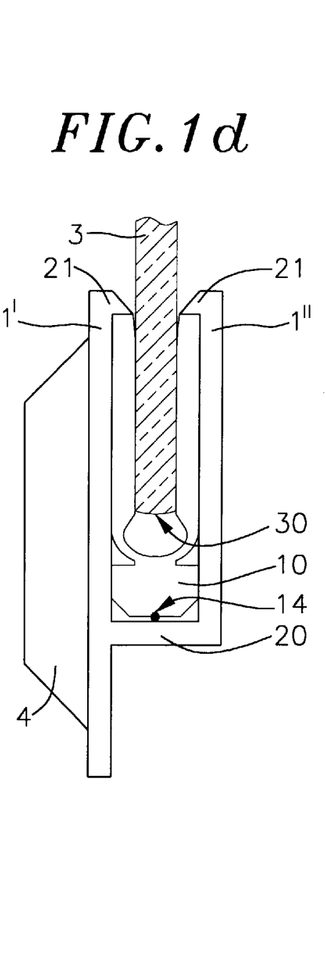
FIG. 1d is similar to FIG. 1c, but showing another side of a window pane with a slanted bottom edge not fully engaged in the linking device.

With the use of the linking device according to the invention in which there is a great variation in the slant of the bottom edge 30 of the window pane, the bottom edge of the window pane 30 will always press against the inner base on one side of the linking device (see FIG. 1c), whereas a gap remains on the other side of the linking device between the edge 30 of the window pane and the base 10 (see FIG. 1d).

A spring 14 positioned between the inner base 10 and the outer base 20 presses the tops of the contact jaws 1', 1" against the bottom edges of the hooks 21 to eliminate any "play" or rattling of the window pane in the outer supporting jaws 2', 2". The spring 14 may also be provided on the outer base 20.

Although it is desirable to eliminate movement of the inner contact jaws 1', 1", and associated window pane 3, in the mounting direction 7 after installation, it is desirable to allow a degree of lateral movement, i.e., perpendicular to mounting direction 7, in the supporting jaws 2', 2". This is to compensate for tolerances required for two-strand cable lifters which have guide rails which are not exactly parallel.

Figure 2A:
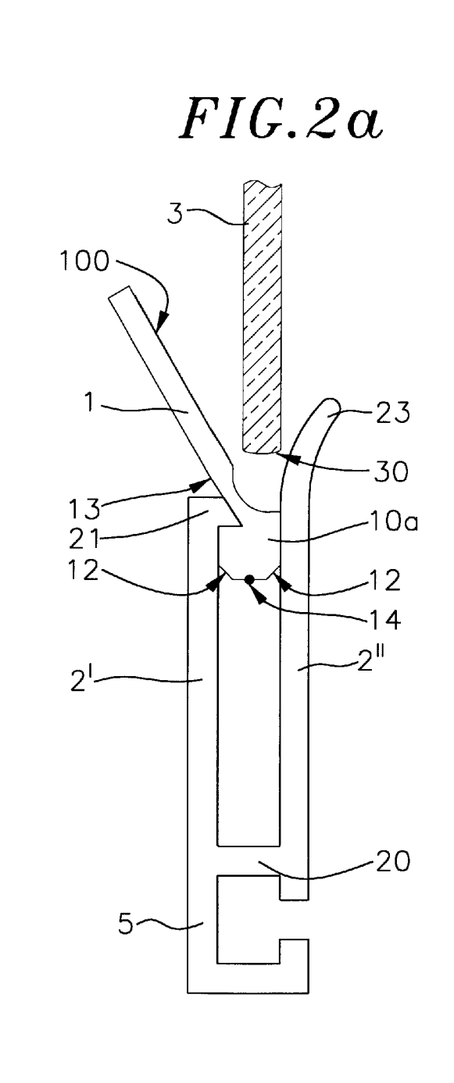
FIG. 2a illustrates an embodiment used to link a window pane with a window lifter using an adhesive link between the inner contact jaws and the window pane before mounting.
Figure 2B:
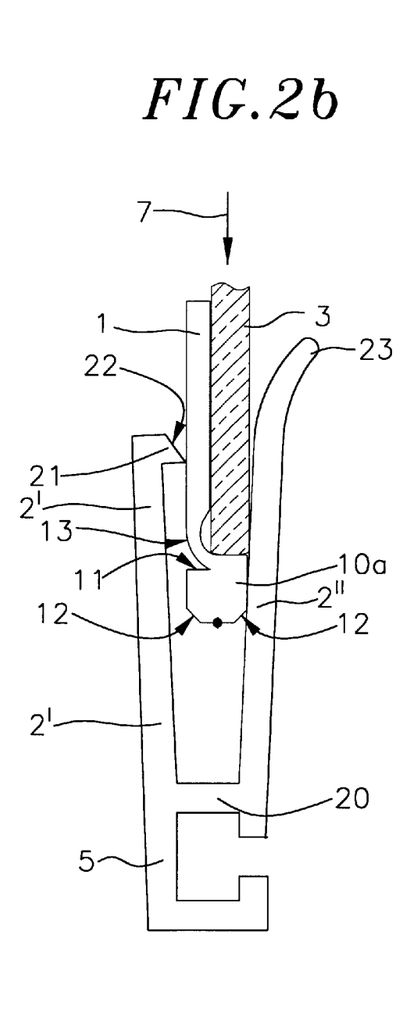
FIG. 2b is similar to FIG. 2a, but shown during mounting.
Figure 2C:
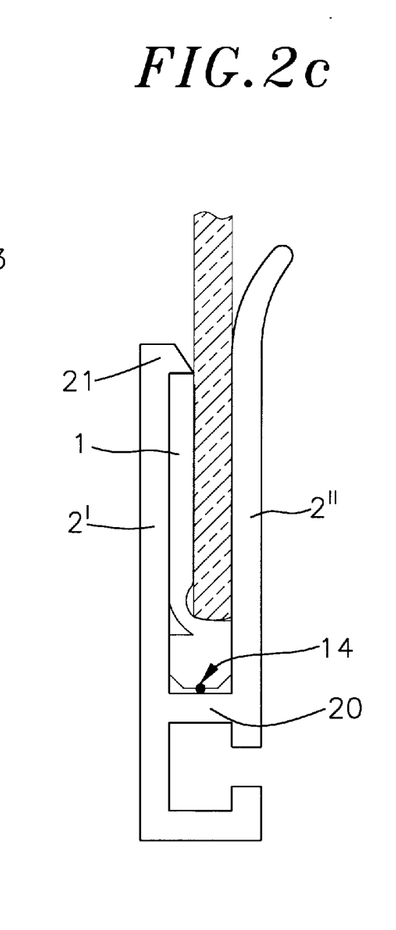
FIG. 2c is similar to FIG. 2a, but shown after completion of mounting in a locked working position.

FIGS. 2a–2c depict a modified variant of the linking device provided for a crank window lifter. The associated base 10a has only one inner contact jaw 1 with one adhesive element 100. Here again, according to the mounting position of FIG. 2, hook 21 formed on the free end of the outer supporting jaw 2' engages the stop surface 11 of the base 10a. The free end of the other supporting jaw 2" is, however, designed as an outwardly pointing extension, which facilitates the insertion of the window pane 3 into the gap between the inner and outer jaws 1, 2' on one side and the outer jaw 2" on the other.

The mounting process (see FIG. 2b) continues until the working position is reached (see FIG. 2c) in a manner analogous to that of the first embodiment described above. If the adhesive element 100 of the one contact jaw 1 is capable of withstanding the window lowering forces required, it is possible to do without the second contact jaw shown in FIG. 1.

Joined to the common base of the supporting jaws 2', 2" is an integrated guide profile 5 in which a sliding element or a roller connected to levers of a crank window lifter (not shown) is guided.

Figure 3A:
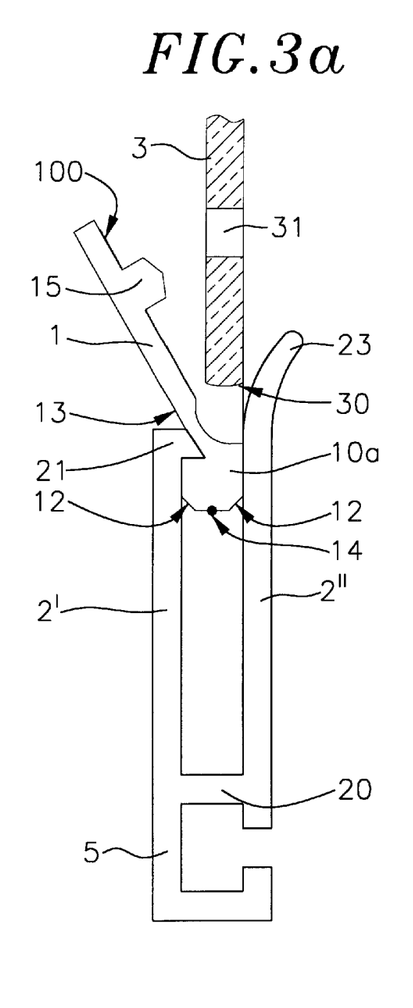
FIG. 3a illustrates an embodiment used to link a window pane with a window lifter using a combination of an adhesive link and form-fitting engagement between one inner contact jaw and the window pane or a hole in the pane before mounting.
Figure 3B:
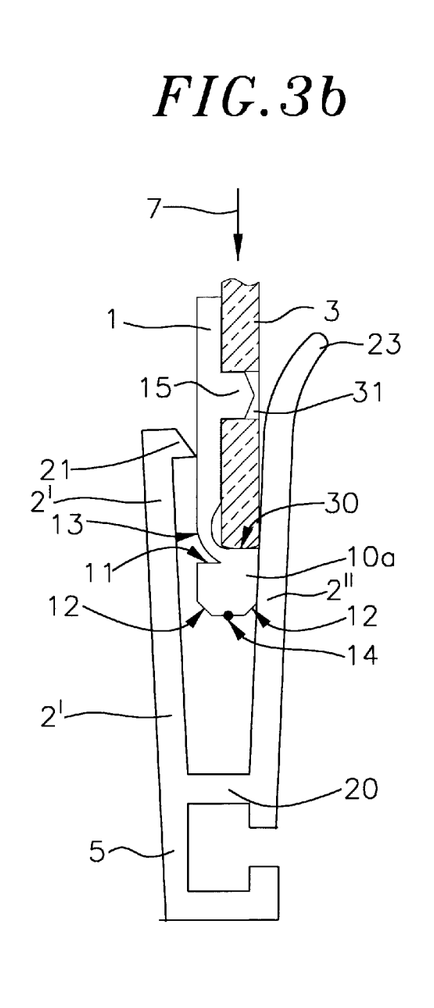
FIG. 3b is similar to FIG. 3a, but shown during mounting.
Figure 3C:
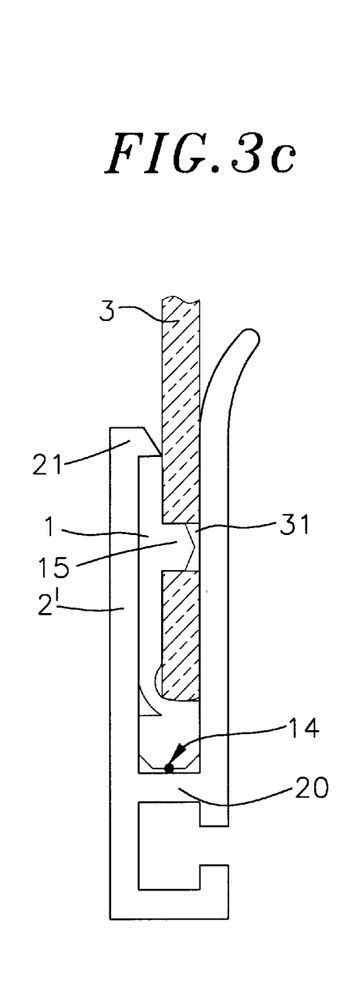
FIG. 3c is similar to FIG. 3a, but shown after completion of mounting in a locked working position.

The embodiment depicted in FIGS. 3a–3c corresponds essentially to that in FIG. 2. However, in addition, the contact jaw 1 bears a pin 15, which engages a hole 31 in the window pane 3 provided for it during the mounting process.

Such a combination of an adhesive link and a form-fitting link significantly increases the stability under lifting load. The form-fitting portion of the link serves primarily to absorb overload forces, such as those which may occur with attempted break-in. The adhesive link is provided for normal operational forces.

Figure 4A:
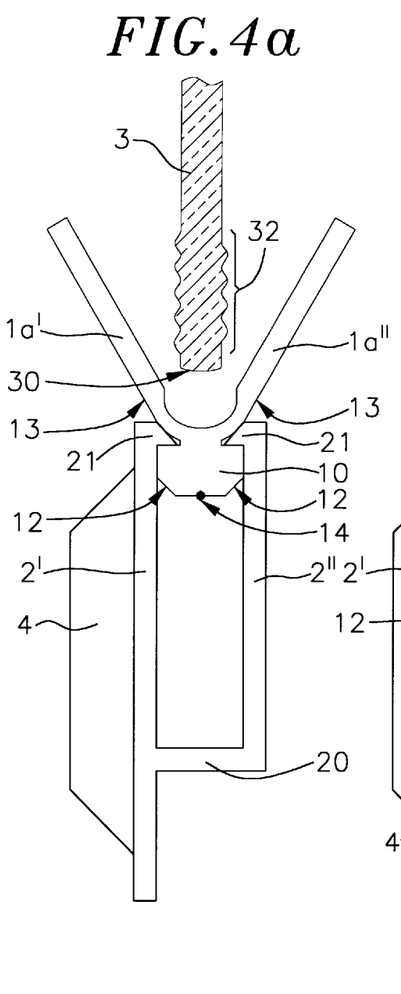
FIG. 4a illustrates an embodiment used to link a window pane with a cable window lifter using a form-fitting link between a pair of plastically deformable inner contact jaws and the window pane with a grooved area before mounting.
Figure 4B:
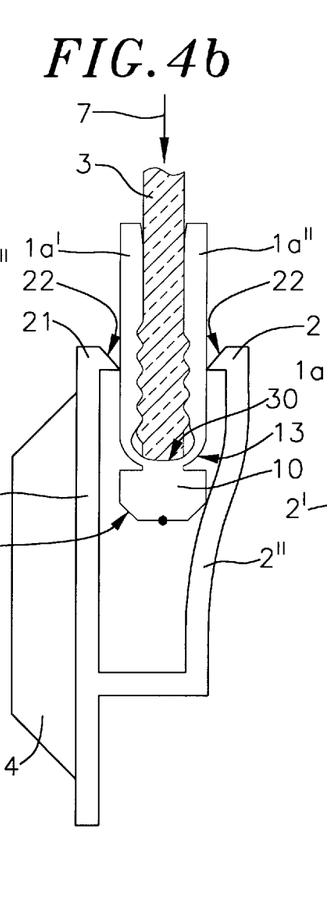
FIG. 4b is similar to FIG. 4a, but shown during mounting.
Figure 4C:
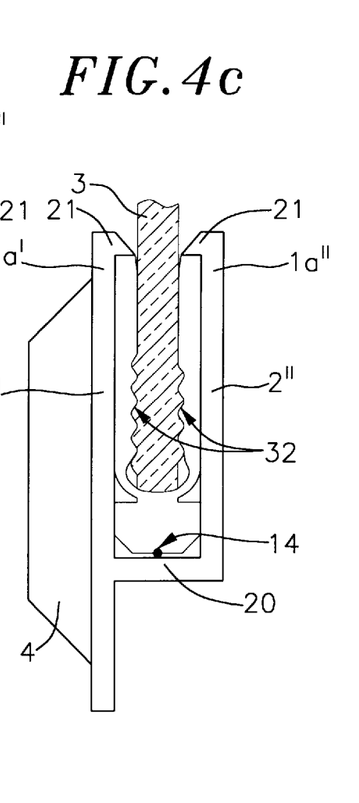
FIG. 4c is similar to FIG. 4a, but shown after completion of mounting in a locked working position.

The structural configuration of the exemplary embodiment according to FIGS. 4a–4c corresponds for the most part to that of FIG. 1. However, here no adhesive link, but rather a pure form-fitting link is used. For this, the window pane 3 has on both sides in the area 32 grooves or the like which can be provided in the body of the window pane itself or as a separate part connected to the window pane 3 (e.g., a thin, glued-on part). During mounting (see FIG. 4b), the contact jaws 1a', 1a", preferably made of flexible plastic, are pressed by the outer supporting jaws 2', 2" against the area 23 of the grooves. The plastic contact jaws 1a' and 1a" are plastically deformed and adapt to the contour of the window pane 3 in the area 32.

In order not to have to apply the necessary deformation forces by means of the outer supporting jaws 2', 2", which may demand a comparatively thick member, it is also possible to provide for thermal plasticizing. For example, the necessary amount of heat may be supplied by means of filaments embedded in the contact jaws 1a', 1a". After the form fitting of the contact jaws 1a', 1a" to the window pane 3 (see FIG. 4c), a permanent and highly load resistant link is available. With the use of saw-tooth-shaped elements in the area 32 of the window pane 3, the load resistance of the link may be further increased.

Figure 5A:
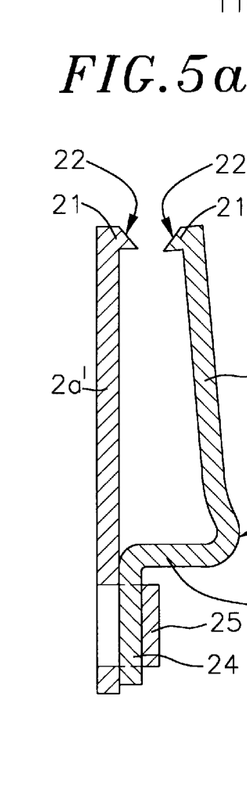
FIG. 5a illustrates an embodiment used to link a window pane with a window lifter using a frictional clamping link between a pair of inner contact jaws, which are acted upon by prestressed outer supporting jaws, and the window pane separate supporting jaws made of sheet metal.
Figures 5B, 5C:
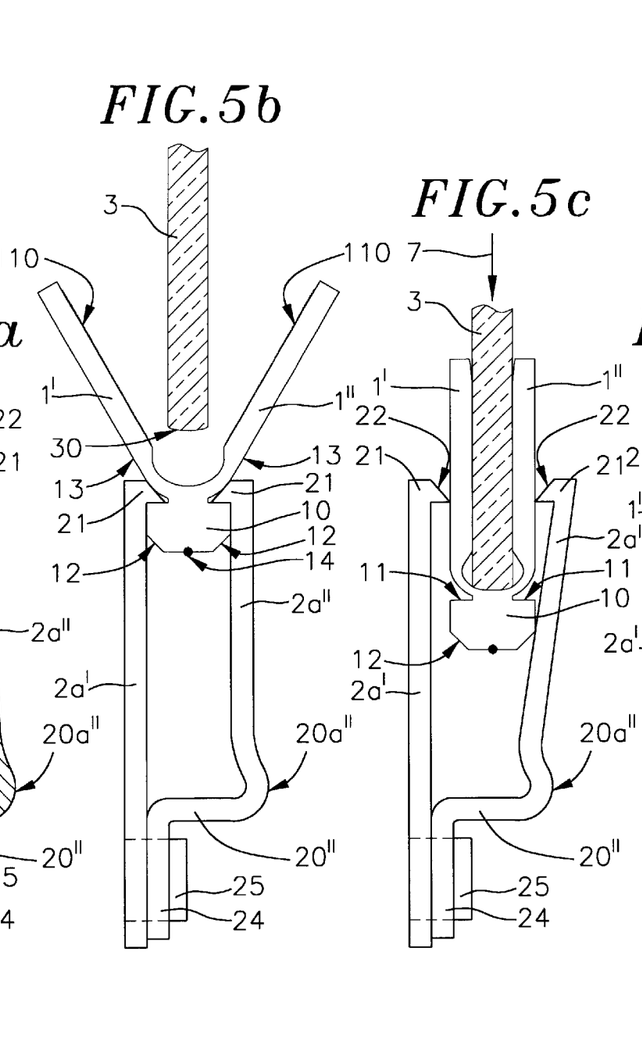
FIG. 5b is similar to FIG. 5a, but showing an embodiment used before mounting.
FIG. 5c is similar to FIG. 5a, but shown during mounting.

Whereas all the above-described embodiments of the invention preferably comprised plastic parts or from parts made of extruded aluminum alloy, the embodiment according to FIGS. 5a–5c selects sheet steel as the starting material. As may be seen in FIG. 5a, the separate supporting jaws 2a', 2a" are held together by a socket joint. The clamping end 24 of one supporting jaw 2a" links the base 20', via elastic deformation area 20a" to the free end of the supporting jaw 2a" and is inserted into the holder 25 which is designed as an extension of the other supporting jaw 2a'.

Since an exclusively frictional link is to be made, the supporting jaws 2a', 2a" must not only lock the inner contact jaws 1', 1" with their hooks 21, they must also generate the clamping force necessary for the frictional link. Consequently, the clamping jaws 2a', 2a" in the non-loaded state (FIG. 5a) form a comparatively narrow gap. By inserting the inner base 10 between the free ends of the supporting jaws 2a', 2a", these jaws obtain their initial tension (see FIG. 5b). Here again, the laterally splayed inner contact jaws 1', 1" are connected to the base 10 by jointed areas 13 all of which are preferably manufactured from plastic. The surfaces of the contact jaws 1', 1" facing the window pane 3 are preferably coated with rubber 110.

Figures 5D, 5E:
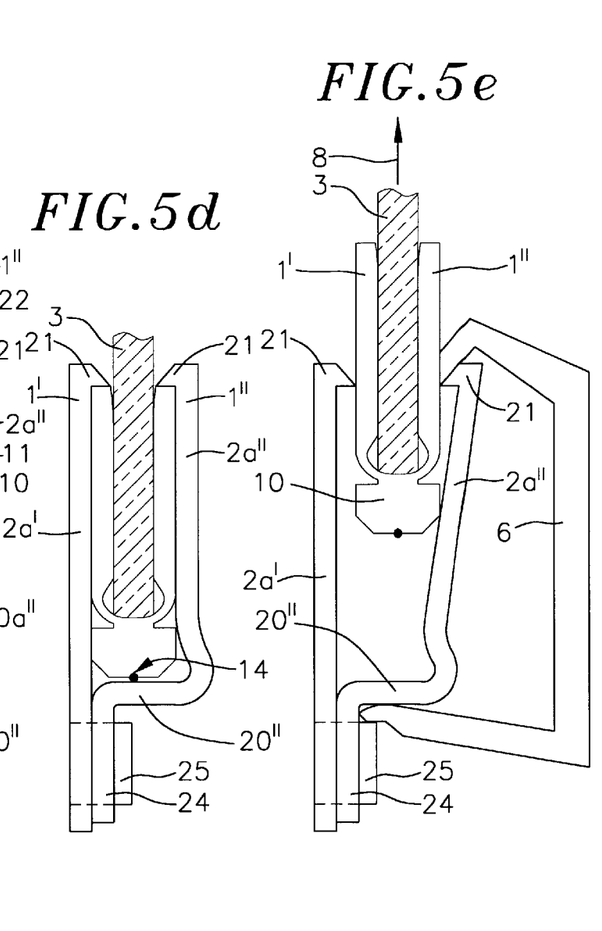
FIG. 5d is similar to FIG. 5a, but shown after completion of mounting in a locked working position.
FIG. 5e is similar to FIG. 5a, but shown with a special tool attached to release the link.

During the mounting process (see FIG. 5c), the bottom edge 30 of the window pane first meets the inner base 10 and presses this in the direction of the outer base 20", whereby at the same time, the contact jaws 1', 1"lie against the surface of the window pane 3. When the spring element 14 and the base 20" come together, the hooks 21 snap over the free ends of the contact jaws 1', 1" and thus lock the position of these components (see FIG. 5d). The lowering force which this link can absorb is essentially determined by the pressure applied by the outer supporting jaws 2a', 2a", and by the coefficient of friction between the rubber layer 110 and the surface of the glass.

FIG. 5a depicts a schematic of a special tool 6 for the release of the link, for example, to replace the window pane 3. For this, one free end of the special tool 6 grips an insertion slope 22 of the hook 21, while the other free end is supported between the outer base 20" and the holder 25. After overcoming the tension of the supporting jaws 2a", the window pane 3 (optionally with the inner contact jaws 1', 1") can be pulled out in dismantling direction 8.

In addition to an alternative embodiment of the invention in the form of a frictional clamping link, an adhesive link or a form-fitting link (or combinations of the links mentioned), there is another advantage in its applicability for cable and crank window lifters. The variety of embodiment possibilities permits optimal adaptation of the invention to the respective prevailing technical conditions and the technical specifications. Thus, a high degree of functional reliability as well as ease of mounting and service can be ensured.

While preferred embodiments of the invention have been illustrated and described, it should be understood that variations will be apparent to those skilled in the art. Accordingly, the invention is not to be limited to the specific embodiments illustrated and described, but should be determined by reference to the following claims.

We claim:

1. A device to link a window pane to a window lifter, the device having a mounting position and a final linked position and comprising:
   a base;
   at least one inner contact jaw comprising an inner side for contacting such window pane, a base end swivellingly attached to the base and having a free end opposite the base; and
   a pair of outer supporting jaws for locking the at least one inner contact jaw therebetween in the final linked position, the pair of outer supporting jaws having upper ends;
   wherein, in the mounting position, before such window pane is first pressed onto the base, the upper end of at least one of the outer supporting jaws engages the base to maintain the at least one inner contact law adjacent the upper end of the at least one of the outer supporting jaws,
   wherein, in the mounting position, when such window pane is first pressed onto the base, the at least one inner contact jaw is splayed at an angle to a plane of the window pane and at least one of the outer supporting jaws engages the base end of the inner contact jaw; and
   wherein, as the device is moved into the final linked position, the at least one inner contact jaw is pressed into contact with the window pane by an adjacent one of the outer supporting jaws.

2. The device according to claim 1 wherein the at least one inner contact jaw and the base comprise a one-piece component.

3. The device according to claim 2 wherein the one-piece component is a plastic part comprising a living hinge joint between the base and the at least one inner contact jaw.

4. The device according to claim 2 wherein the one-piece component is a metal part comprising a flexible joint between the base and the at least one inner contact jaw.

5. The device according to claim 1 wherein at least one of the outer supporting jaws comprises a hooked end and the base comprises at least one stop surface for engaging the hooked end of the at least one outer supporting jaws in the mounting position.

6. The device according to claim 5 wherein the hooked end of the at least one outer supporting jaws engages the free end of the at least one inner contact jaw in the final linked position, thereby locking the at least one inner contact jaw in the final linked position.

7. The device according to claim 1 wherein the inner side of the at least one inner contact jaw is provided with an adhesive.

8. The device according to claim 7 wherein the adhesive is a two-sided adhesive tape.

9. The device according to claim 7 further comprising a reservoir for containing the adhesive and wherein the adhesive is sealed in the reservoir in the mounting position and is released under the pressure of the at least one inner contact jaw in the working position.

10. The device according to claim 7 wherein the adhesive is activated by heating.

11. The device according to claim 1 wherein the inner side of the at least one inner contact jaw includes a friction layer having a high coefficient of friction when in contact with such window pane, which in the final linked position is pressed against the window pane by the pair of outer supporting jaws.

12. The device according to claim 1, wherein the pair of outer supporting jaws are adapted to completely house the base and the at least one inner jaw in the final linked position,
   wherein, at least one of the outer supporting jaws comprises a hooked end,
   wherein, the base comprises at least one stop surface for engaging the hooked end of the outer supporting jaws in the mounting position, and
   wherein, the hooked end of the at least one outer supporting jaws engages the face end of the at least one inner contact jaw in the final linked position, thereby locking the at least one inner contact jaw in the final linked position.

13. The device according to claim 1, wherein in the final linked position the at least one inner jaw is locked between the outer supporting jaws.

14. A device to link a window pane to a window lifter, the device having a mounting position and a working position and comprising:

a base;

at least one inner contact jaw comprising an inner side for contacting such window pane, a base end swivellingly attached to the base and having a free end opposite the base; and a pair of outer supporting jaws for locking the at least one inner contact jaw therebetween in the working position, wherein, in the mounting position, when such window pane is first pressed onto the base, the at least one inner contact law is splayed at an angle to a plane of the window pane and the at least one of the outer supporting jaws engages the base end of the inner contact jaw, wherein, as the device is moved into the working position, the at least one inner contact jaw is hinged against the window pane by an adjacent one of the outer supporting jaws, and wherein, a portion of the at least one inner contact jaw is plastically deformable and wherein said portion deforms to mate with a plurality of grooves on such window pane.

15. The device according to claim 14 wherein said deformable portion deforms when heated.

16. The device according to claim 14 wherein said deformable portion plastically deforms under pressure.

17. Apparatus for linking a window pane to a window lifter, the apparatus having a mounting position and a locked position and comprising:

an inner base;

a pair of inner jaws for holding the window pane therebetween, each inner jaw comprising a base end hingedly connected to the inner base, a free end opposite the inner base, an inner side, and an outer side;

a pair of junctions, each junction located between the inner base and one of the inner jaws; and a pair of spaced-apart outer jaws adapted to completely house the inner base and the inner jaws, each outer jaw comprising a hooked end, wherein in the mounting position the hooked end engages an adjacent one of the junctions and in the locked position engages the free end of an adjacent one of the inner jaws.

18. Apparatus for linking a window pane to a window lifter, the apparatus having a mounting position and a locked position and comprising:

an inner base;

an inner jaw comprising a base end hingedly connected to the inner base and a free end opposite the inner base;

a junction between the inner base and the inner jaw; and a pair of spaced-apart outer jaws adapted to completely house the inner base and the inner jaw, a first outer jaw adjacent the inner jaw comprising a hooked end and a second outer jaw comprising an end curved away from the inner jaw, wherein in the mounting position, before the window pane is pressed onto the inner base, the first outer jaw hooked end engages the junction and in the locked position the first outer jaw hooked end engages the free end of the inner jaw.

* * * * *